(12) United States Patent
Aten

(10) Patent No.: US 9,347,398 B2
(45) Date of Patent: May 24, 2016

(54) ACTUATOR SUPPORT SYSTEM AND APPARATUS

(71) Applicant: ROHR, INC., Chula Vista, CA (US)

(72) Inventor: Michael Ray Aten, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 302 days.

(21) Appl. No.: 14/047,224

(22) Filed: Oct. 7, 2013

(65) Prior Publication Data

US 2015/0097055 A1    Apr. 9, 2015

(51) Int. Cl.
  *F02K 1/72*    (2006.01)
  *F02K 1/76*    (2006.01)

(52) U.S. Cl.
  CPC . *F02K 1/72* (2013.01); *F02K 1/763* (2013.01); *F05D 2230/50* (2013.01); *F05D 2260/30* (2013.01); *F05D 2260/941* (2013.01)

(58) Field of Classification Search
  CPC .............. F02K 1/72; F02K 1/76; F02K 1/763
  See application file for complete search history.

(56) References Cited

U.S. PATENT DOCUMENTS

| 4,145,877 A | 3/1979 | Montgomery |
| 4,852,805 A * | 8/1989 | Vermilye .......... B29C 45/14631 239/265.11 |
| 2013/0200178 A1 | 8/2013 | Welch et al. |

FOREIGN PATENT DOCUMENTS

| EP | 2138697 | 12/2009 |
| FR | 2960918 | 12/2011 |

OTHER PUBLICATIONS

Extended European Search Report dated Mar. 5, 2015 in European Application No. 14187863.7.

* cited by examiner

*Primary Examiner* — Ehud Gartenberg
*Assistant Examiner* — Filippo Manfredi
(74) *Attorney, Agent, or Firm* — Snell & Wilmer, LLP

(57) ABSTRACT

A cascade support structure for a cascade type thrust reverser system is provided. One or more cascades may comprise one or more flanges. One or more actuators may also comprise one or more flanges. The cascades may be coupled to and/or supported by the actuators via the flanges. The cascades and/or actuators may also be configured to couple to one or more track beams via the ore or more flanges.

15 Claims, 3 Drawing Sheets

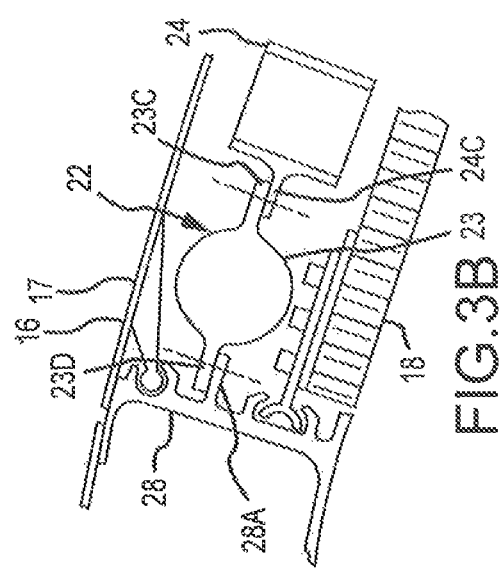
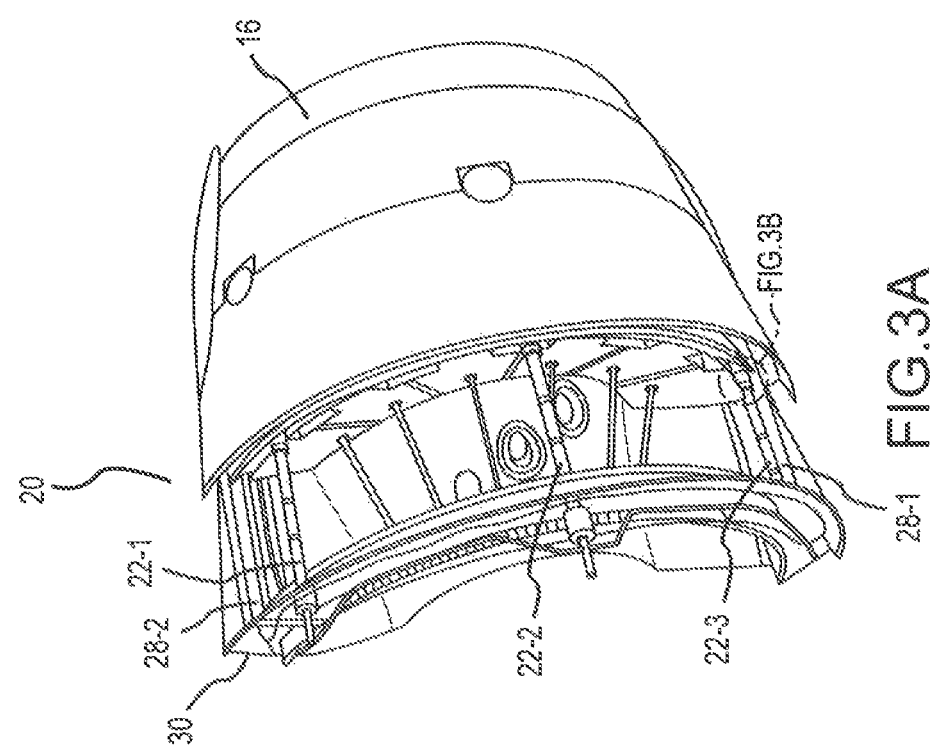

US 9,347,398 B2

ACTUATOR SUPPORT SYSTEM AND APPARATUS

FIELD

The present disclosure relates to cascade-type thrust reverser systems, and more specifically, to structural supports for cascade-type thrust reverser systems.

BACKGROUND

Typical aircraft engines and/or nacelles generally comprise a thrust reverser system. The thrust reverser system may be configured to provide reverse thrust to slow the aircraft during a landing event (e.g., after touchdown). Thrust reverser support structures may affect the external profile and/or aerodynamic features of an aircraft, possibly reducing the overall efficiency of the aircraft in flight.

SUMMARY

In various embodiments, a thrust reverser system may comprise a first cascade, a second cascade and a first actuator. The first cascade may include a first flange. The second cascade may include a second flange. The first actuator may comprise a body. The body may include a third flange and a fourth flange. The first cascade may be operatively coupled to the first actuator by the first flange and the third flange. The second cascade may be operatively coupled to the first actuator by the second flange and the fourth flange.

In various embodiments, a propulsion system may comprise a translating sleeve, a plurality of cascades, a plurality of actuators, a first track beam and a second track beam. Each cascade of the plurality of cascades may comprise a first flange and a second flange. Each of the actuators of the plurality of actuators may comprise a third flange and a forth flange. The first track beam may comprise a fifth flange. The second track beam may comprise a sixth flange. A first cascade of the plurality of cascade may be coupled to a first actuator of the plurality of actuators via the first flange and the third flange. The first cascade may be coupled to the first track beam via the second flange and the fifth flange.

In various embodiments, a cascade assembly may comprise a first cascade, a second cascade and a first actuator. The first cascade may include a first flange and a second flange. The second cascade may include a third flange and a fourth flange. The first actuator may comprise a body, which may include a fifth flange and a sixth flange. The first cascade may be coupled to the second cascade through the body of the first actuator via the first flange being coupled to the firth flange and the third flange being coupled to the sixth flange.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIG. 3A illustrates a perspective view of a portion of a thrust reverser system, in accordance with various embodiments.

FIG. 3B illustrates a perspective view of an actuator support, in accordance with various embodiments.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Furthermore, any reference to similar includes plural embodiments, and any reference to more than one component or step may include a singular embodiment or step. Surface shading lines may be used throughout the figures to denote different parts, but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

Figure 1:
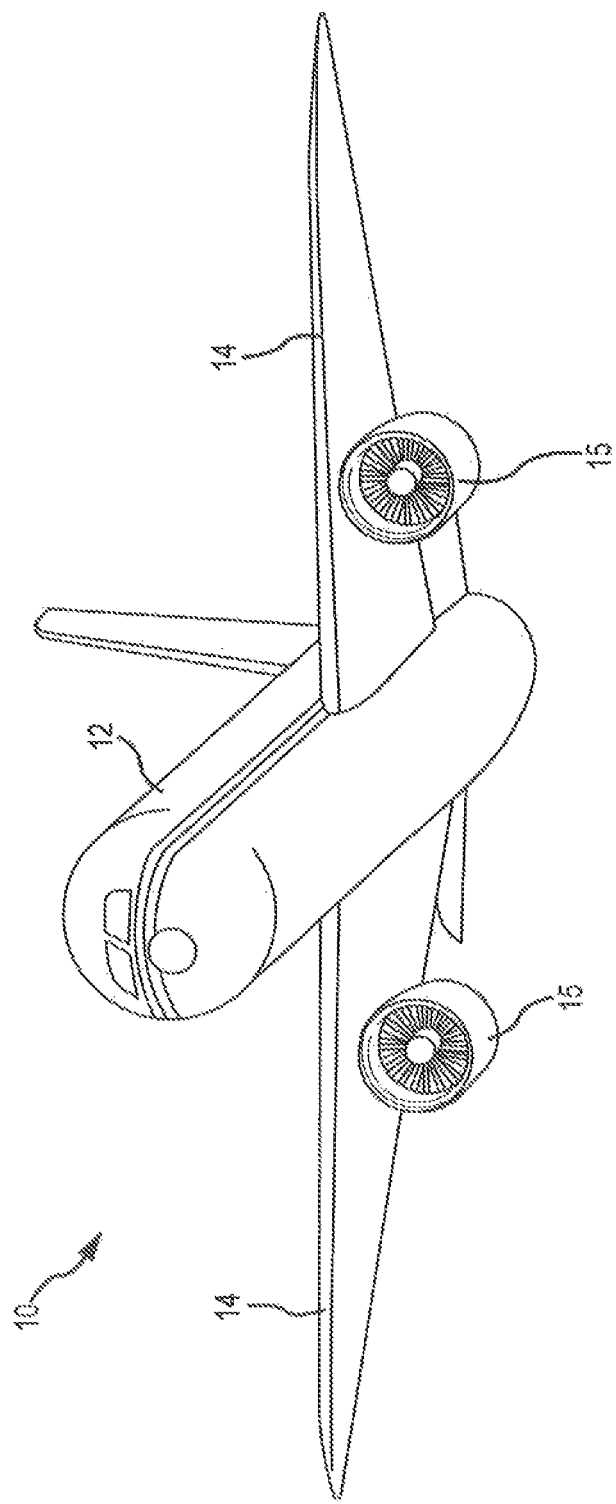
FIG. 1 illustrates a perspective view of an aircraft, in accordance with various embodiments.

With reference to FIG. 1, an aircraft 10 may comprise a fuselage 12 and a pair of wings 14. Aircraft 10 may further comprise a propulsion system 15 (e.g., a gas turbine engine-nacelle assembly). Propulsion system 15 may be mounted to the undersides of wings 14. Propulsion system 15 may comprise a fan and an engine core. Moreover, the engine core is configured to drive a fan to create forward thrust and/or propulsion for aircraft 10. The engine core and fan are typically enclosed and/or housed in a nacelle. The nacelle may comprise a thrust reverser system.

Figure 2B:
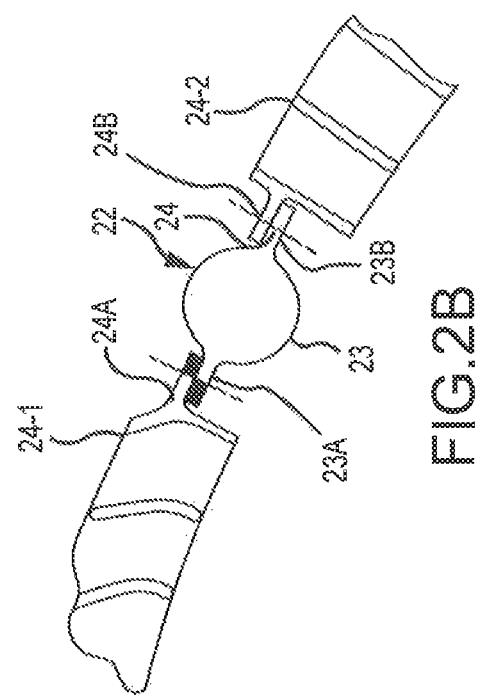
FIG. 2B illustrates a perspective view of an actuator support, in accordance with various embodiments.
Figure 2A:
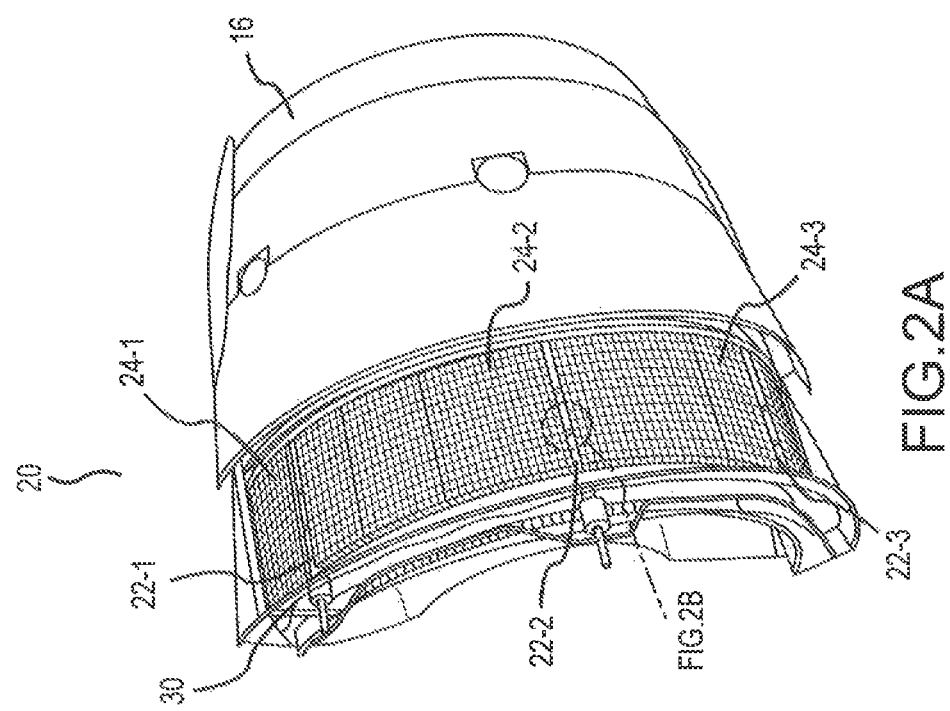
FIG. 2A illustrates a perspective view of a portion of a thrust reverser system, in accordance with various embodiments.

In various embodiments, and with reference to FIGS. 2A and 2B, thrust reverser system 20 may be a cascade-style thrust reverser system. Thrust reverser system 20 may comprise a translating sleeve 16, one or more actuators 22 (shown as 22-1, 22-2 and 27-3 in FIG. 2A), and one or more cascades 24 (shown as 24-1, 24-2 and 24-3 in FIG. 2A). Actuators 22 may comprise a first end and a second end. The first end may be coupled to a torque box 30. The second end may be coupled to translating sleeve 16. In this regard, the first end of actuator 22 is fixed to torque box 30 and the second end of actuator 22 is configured to translate forward and of with translating sleeve 16. In operation, actuators 22 may be activated to translate translating sleeve 16 aft in response to a landing event (e.g., touchdown of the aircraft wheels) and/or thrust reverser system 20 being activated.

In various embodiments, and with momentary reference to FIG. 3B, these cascades may be housed in a nacelle within translating sleeve 16. Translating sleeve 16 may comprise an inner sleeve 17 and an outer sleeve 18. Inner sleeve 17 and outer sleeve 18 may be join together and may define a channel. When translating sleeve 16 is in a stowed (e.g., a forward position), cascades 24 may be housed within translating sleeve 16 in the channel defined by inner sleeve 17 and outer sleeve 18.

In various embodiments, and with reference to FIGS. 2A-2B, cascades 24 may be coupled to one another by an actuator 22. Actuator 22 may comprise a body 23. Body 23 may comprise one or more actuator flanges (e.g., actuator flanges 23A and 23B). Actuator flanges 23A and 23B may be an assembly that attaches to body 23 or may be integrally formed as a portion of body 23. Cascades 24 may also comprise one of more cascade flanges (e.g., cascade flanges 24A and 24B). Cascade flanges 24A and 24B may be an assembly that attaches to cascade 24 or may be integrally formed as a portion of cascade 24. Actuator flanges 23A and 23B may be configured to couple to and support cascade flanges 24A and 24B. In this regard, one or more cascades 24 may be joined and/or supported by one or more actuators 22 at actuator flanges 23A and 23B and cascade flanges 24A and 24B. The connection between the flanges (e.g., actuator flanges 23A and 23B and cascade flanges 24A and 24B) may be secured by any suitable fastener, bond, connector, and/or the like.

In various embodiments, and with reference to FIGS. 3A and 3B, thrust reverser system 20 may also include one or more track beams 28 (e.g., track beams 28-1 and 28-2 as shown in FIG. 3A) extending forward to aft. Actuator 22 may also be configured to mount to track beam 28 and cascade 24. Body 23 may comprise one or more actuator flanges (e.g., actuator flanges 23C and 23D). Track beam 28 may comprise one or more track beam flanges (e.g., track beam flange 28A). Cascade 24 may comprise one or more cascade flanges (e.g., cascade flange 24C). Track beam flange 28A may be configured to couple to and/or be joined to actuator flange 23D. Cascade flange 24C may be configured to couple to and/or be joined to actuator flange 23D. In this regard, body 23 may support and/or couple cascade 24 to track beam 28. As discussed herein, the connection between the flanges (e.g., track beam flanges 28A and actuator flange 23D) may be secured by any suitable fastener, bond, connector, and/or the like. Moreover, the coupling of one or more cascades 24 together through actuators 22 and to one or more track beams 28, creates a continuous hoop load path through the cascades that may allow for other supporting structure to be minimized and/or eliminated.

In various embodiments, typical cascade-style thrust reverser systems comprise an aft cascade ring. This aft cascade ring generally couples a plurality of cascades to one another over the radius of the cascade assembly at the aft end of the cascade assembly. The at cascade ring may be configured to support the hoop defined by the cascade assembly. In various embodiments, this aft cascade ring may impose design limitations on the outer and/or overall envelope of the nacelle surface including, for example, the translating sleeve. In various embodiments, creating a load and support path with between actuators 22, cascades 24, and track beams 28 may allow the aft cascade ring to be minimized and/or removed from the thrust reverser system 20. Moreover, in various embodiments, actuator 22 may be capable of operating with a side load applied.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A thrust reverser system, comprising:
   a first cascade including a first flange;
   a second cascade including a second flange; and
   a first actuator comprising a body, wherein the body comprises a third flange and a fourth flange,
   wherein the first cascade is operatively coupled to the first actuator by the first flange and the third flange,
   wherein the second cascade is operatively coupled to the first actuator by the second flange and the fourth flange, and
   wherein the first cascade, the first flange the third flange, the actuator, the fourth flange, the second flange, and the second cascade form a portion of a hoop load path.

2. The thrust reverser system of claim 1, wherein the first cascade comprises a fifth flange.

3. The thrust reverser system of claim 2, further comprising a second actuator comprising a body including a sixth flange and a seventh flange, wherein the first cascade is operatively coupled to the second actuator by the fifth flange and the sixth flange.

4. The thrust reverser system of claim 3, further comprising a track beam comprising an eighth flange.

5. The thrust reverser system of claim 4, Wherein the second actuator is operatively coupled to the track beam by the seventh flange and the eighth flange.

6. The thrust reverser system of claim 5, wherein the first cascade, the second cascade, and the second actuator form an assembly that is operatively coupled to the track beam.

7. The thrust reverser system of claim 6, wherein the assembly defines the hoop load path.

8. the thrust reverser system of claim 1, wherein the assembly is housed within a translating sleeve of the thrust reverser system.

9. A propulsion system, comprising:
   a translating sleeve;
   a plurality of cascades, each cascade of the plurality of cascades comprising a first flange and a second flange;
   a plurality of actuators, each actuator of the plurality of actuators comprising a body, wherein the body comprises a third flange and a fourth flange;
   a first track beam comprising a fifth flange; and
   a second track beam comprising a sixth flange,
   wherein a first cascade of the plurality of cascades is coupled to a first actuator of the plurality of actuators via the first flange and the third flange, and
   wherein the first cascade is coupled to the first track beam via the second flange and the fifth flange, and
   wherein the plurality of cascades and the plurality of actuators form a portion of a hoop load path.

10. The propulsion system of claim 9, wherein the plurality of cascades and the plurality of actuators are coupled together to form a cascade assembly.

11. The propulsion system of claim 10, wherein the translating sleeve comprises an inner sleeve and an outer sleeve, and wherein the cascade assembly is housed between the inner sleeve and the outer sleeve when the translating sleeve is in the stowed position.

12. The propulsion system of claim 9, wherein the plurality of cascades and the plurality of actuators are coupled together to form a hoop load path between the first track beam and the second track beam.

13. The propulsion system of claim 9, wherein a second cascade of the plurality of cascades is coupled to the first actuator via the first flange of the second cascade and the forth flange of the first actuator.

14. The propulsion system of claim 13, wherein the second cascade is coupled to a second actuator of the plurality of actuators via the second flange of the second cascade and the third flange of the second actuator.

15. The propulsion system of claim 9, wherein the plurality of cascades comprises the first cascade, a second cascade and a third cascade.

* * * * *

UNITED STATES PATENT AND TRADEMARK OFFICE
CERTIFICATE OF CORRECTION

| | | |
|---|---|---|
| PATENT NO. | : 9,347,398 B2 | |
| APPLICATION NO. | : 14/047224 | |
| DATED | : May 24, 2016 | |
| INVENTOR(S) | : Michael Ray Aten | |

It is certified that error appears in the above-identified patent and that said Letters Patent is hereby corrected as shown below:

On the Title page, item (57), line 7, please delete "ore" and insert therefor --one--.

In the Claims

In column 6, line 3, after "flange," please delete "and".

Signed and Sealed this
Ninth Day of August, 2016

Michelle K. Lee
*Director of the United States Patent and Trademark Office*